United States Patent
Bloch et al.

(10) Patent No.: US 6,491,132 B2
(45) Date of Patent: Dec. 10, 2002

(54) STEERING DEVICE

(75) Inventors: Jesper Bloch, Nordborg (DK); John Kristensen, Sønderborg (DK); Torben Frederiksen, Augustenborg (DK); Skjold Rune Mortensen, Valby (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 35 days.

(21) Appl. No.: 09/742,491

(22) Filed: Dec. 20, 2000

(65) Prior Publication Data
US 2001/0007295 A1 Jul. 12, 2001

(30) Foreign Application Priority Data
Dec. 20, 1999 (DE) .......................... 199 61 886

(51) Int. Cl.⁷ ................................. B62D 5/04
(52) U.S. Cl. ...................... 180/446; 180/444
(58) Field of Search ................. 180/443, 444, 180/446; 701/41

(56) References Cited

U.S. PATENT DOCUMENTS

| | | | | |
|---|---|---|---|---|
| 5,704,446 A | * | 1/1998 | Chandy et al. ............. | 180/446 |
| 5,717,590 A | * | 2/1998 | Mihalko ............... | 364/424.051 |
| 5,857,160 A | * | 1/1999 | Dickinson et al. ............ | 701/41 |
| 6,050,360 A | * | 4/2000 | Pattok et al. ................ | 180/446 |
| 6,129,171 A | * | 10/2000 | Takaoka ..................... | 180/444 |
| 6,155,377 A | * | 12/2000 | Tokunaga et al. ........... | 180/446 |
| 6,250,420 B1 | * | 6/2001 | Brenner et al. ............. | 180/443 |
| 6,260,655 B1 | * | 7/2001 | Mukai et al. ............... | 180/446 |
| 6,295,879 B1 | * | 10/2001 | Miller et al. ............. | 73/862.08 |

FOREIGN PATENT DOCUMENTS

DE  197 14 786 C1  *  4/1997

* cited by examiner

Primary Examiner—Brian L. Johnson
Assistant Examiner—L. Lum
(74) Attorney, Agent, or Firm—Lee, Mann, Smith, McWilliams, Sweeney & Ohlson

(57) ABSTRACT

A steering device with a steering angle transducer, a steering drive having a motor and a first gear, at least one wheel driven by the steering drive and a sensor arrangement for detecting the angle position of the wheel with a detection device, which produces a reference signal for at least one reference position of the steering device. In this connection, it is desired to improve the reliability of the steering device. For this purpose, the detection device is connected with the motor via a second gear.

20 Claims, 2 Drawing Sheets

STEERING DEVICE

BACKGROUND OF THE INVENTION

The invention concerns a steering device with a steering angle transducer, a steering drive having a motor and a first gear, at least one wheel driven by the steering drive and a sensor arrangement for detecting the angle position of the wheel with a detection device, which produces a reference signal for at least one reference position of the steering device.

A steering device of this kind is known from DE 197 14 786 C1.

Such steering devices are, for example, used in forklift trucks, used in warehouses for transporting palleted goods. Usually, they have a three-wheel configuration, the rear wheel being steered. However it is also possible for such a vehicle to have four wheels, two wheels being steered in pairs or all wheels being steered. For reasons of clarity, however, it will be assumed in the following that only one wheel is steered.

In the known steering device, the sensor arrangement has a sensor, which detects the relative rotation of the motor shaft. With relatively small efforts, such detection can be made with the required accuracy. To make sure that this relative movement is related to a fixed starting position, a detection device is provided, which produces a reference signal at a reference position of the steering drive. This detection device has a trigger on a transmission element of the steering drive, which cooperates with a detector. The trigger is arranged on a chain, which connects a gear wheel on the driven wheel with a gear wheel on the output shaft of the gear.

In most cases, this steering device works satisfactorily. Problems occur, when the vehicle is used in a heavily contaminated environment, for example, a foundry or a waste utilisation plant. In these cases, there is a risk that the detection device is contaminated, thus not being able to work accurately any longer. Additionally, there is a risk that the detection device is damaged.

SUMMARY OF THE INVENTION

The invention is based on the task of increasing the reliability of the steering device.

In a steering device as described in the introduction, this task is solved in that the detection device is connected with the motor via a second gear.

Thus, selecting the placing or positioning of the detection device is free. It is no longer required to arrange the detection device close to the steered wheel. On the contrary, via the second gear it can be arranged in a position, in which less contamination or a reduced risk of damaging is anticipated. By means of the second gear, it is possible to produce the reference signal of the reference position, that is, the advantages obtained until now are maintained to the full extent.

In this connection, it is particularly preferred that the gear ratio of the second gear is so high that its output shaft connected with the detection device performs not more than one complete rotation, when the driven wheel moves from one extreme position to the other. Thus, exactly one angle position of the output shaft of the drive is allocated to each angle position of the driven wheel, so that the reference signal can only be produced at the reference position. Actually, then the detection device would be sufficient to determine the angle position of the steered wheel. However, then extremely accurately working detection devices would be required, which can be avoided, if, for example, as shown in DE 197 14 786 C1, additional sensors are used.

Preferably, the second gear has the same gear ratio as the product of all gear ratios between the output shaft of the motor and the driven wheel. This results in a 1:1 ratio between the output shaft of the second gear, on which the detection device for detecting the reference position is arranged, and the steered wheel. An embodiment of this kind is particularly advantageous, when the steered wheel has no mechanical stops, but can be turned more or less optionally several times. Also in this case, a reference position can always be "found", on the basis of which the change of the rotation angle can be detected.

Preferably, the second gear and the detection device are integrated in the steering drive. For example, this means that the second gear and the detection device are also covered by a housing arranged on the steering drive. This reduces the risk of contamination and the risk of damaging. Additionally, the complete steering device becomes compact and easier to mount.

Preferably, the detection device is made as a touchfree working detection device. This reduces wear, and on a long sight thus ensures an accurate detection of the reference position.

In a particularly preferred embodiment, it is provided that the detection device performs no reaction forces on the outlet shaft of the second gear. Accordingly, the gear can be made very cheap. It is not supposed to transmit forces. Merely the internal friction of the gear must be overcome. Such gears can, for example, be made of a plastic material, so that their weight remains small. As the gear does not contain any load transmitting function, it can also be made relatively cheap.

Advantageously, the sensor arrangement has a sensor, which detects a relative movement of the motor shaft, the sensor producing more than one pulse per rotation. A sensor, which detects a relative movement of the motor shaft, is known from the DE 197 14 786 C1 mentioned above. As a matter of fact, this sensor can, in a manner of speaking, incrementally determine the number of rotations performed by the motor shaft. As the gear ratio between the motor shaft and the driven or steered wheel is known, the number of rotations of the motor shaft will permit a conclusion with regard to the deflection of the steered wheel. When now per rotation of the motor shaft, which may also already be geared by a gear with constant ratio, more than one pulse is produced, the evaluation can be made far more accurate.

In this connection, it is particularly preferred that the number of pulses per rotation is an exponent of the number 2. That is, for example, 16, 32, 64 or 128 pulses per rotation. The higher the number of pulses is, the better and more exact is the resolution.

Preferably, the detection device and the sensor are connected with a control device, which has a counter, counting the pulses of rotations in one direction positively and of rotations in the other direction negatively, a control device being provided, which produces an error signal, if the counter exceeds zero by a predetermined amount, when the detection device displays the passing of the reference position. Counting up and down is a relatively simple measure of determining the steering angle of the driven wheel. Due to mechanical insufficiencies, however, a difference between the actually counted pulses and the steering angle of the wheel will occur in many cases. To compensate for this error, the reference position is provided. Normally, the counter will be reset to zero when reaching the reference position, so that the subsequent steering movements can again be detected with the desired reliability. However, if on reaching the reference position, it turns out that the error is too large, that is, exceeds a predetermined tolerance, an error message will be produced to warn the driver of the vehicle or to effect a test and maintenance of the steering device.

Advantageously, a section of the output shaft of the motor, on which the sensor is arranged, traverses the second gear. Thus, the sensor and the detection devices are also physically arranged next to each other. This gives several advantages. Firstly, space is saved. Both units can be held in one housing. Both arrangements are submitted to the same environmental conditions. Secondly, the risk of different measuring results caused by a difference in location is relatively small.

BRIEF DESCRIPTION OF THE DRAWINGS

In the following, the invention is described in detail on the basis of a preferred embodiment as shown in the drawings.

DESCRIPTION OF THE PREFERRED EMBODIMENT

Figure 2:
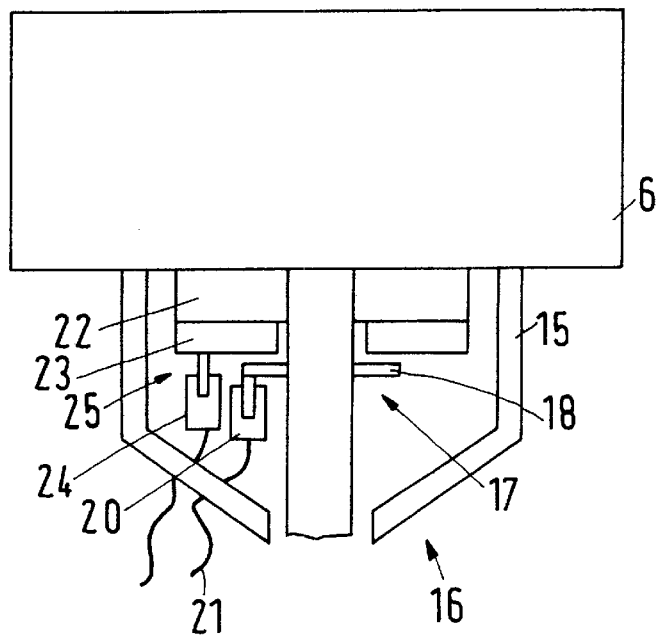
FIG. 2 a schematic section through part of the steering drive
Figure 1:
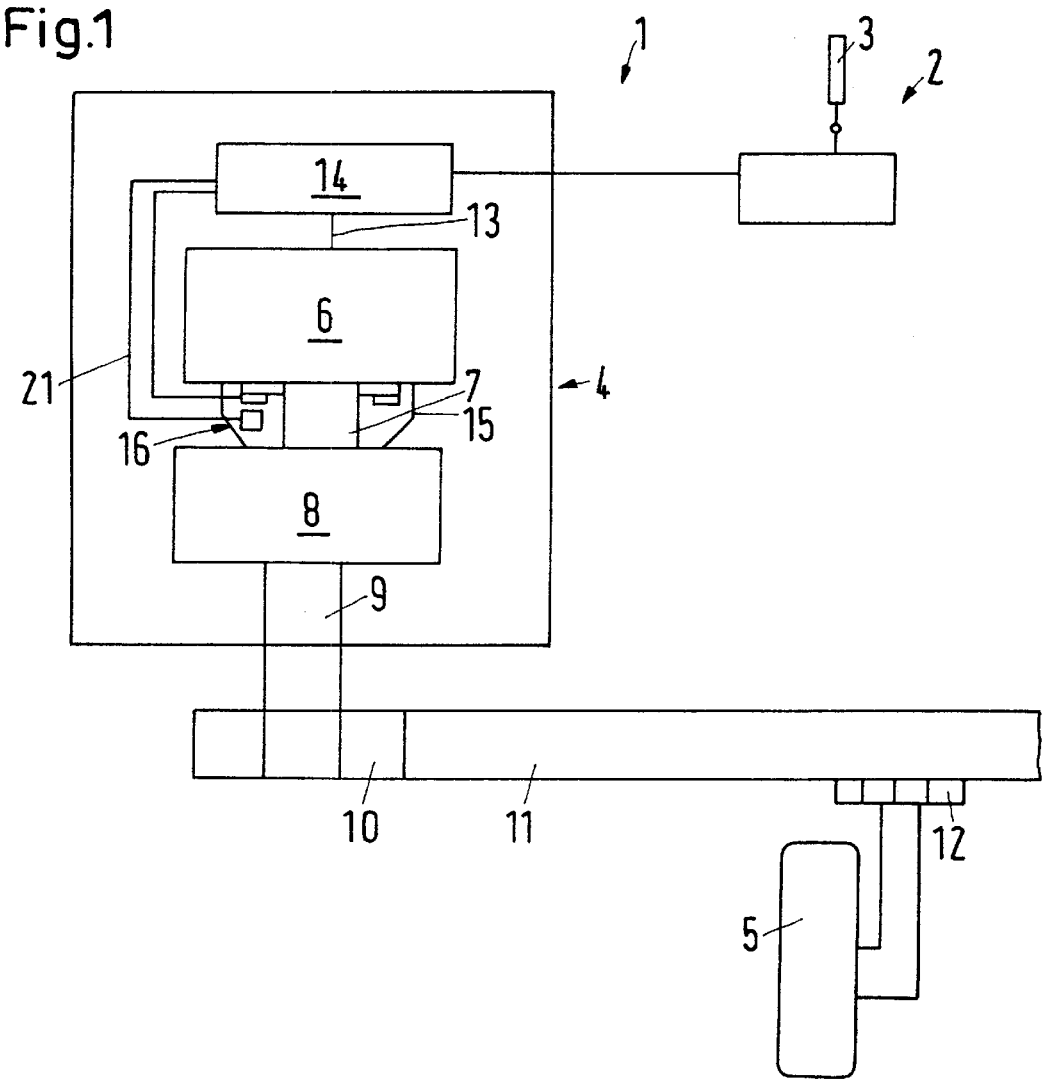
FIG. 1 a schematic view of a steering device

A steering device 1 has a steering angle transducer 2, in the present case in the shape of a "joystick" 3. However, it can also have the shape of an ordinary steering hand-wheel.

Further, the steering device 1 has a steering drive 4, by means of which the angle position of a schematically shown steered wheel 5 can be changed. Between the steering angle transducer 2 and the steered wheel there is in the present case no mechanical, active connection, that is, the steering angle transducer 2 has no mechanical influence on the wheel 5, and the wheel 5 has no mechanical influence on the steering angle transducer 2. However, an electronic feedback would be possible, with which forces from the steered wheel are fed back to the steering angle transducer without mechanical coupling, thus giving the driver the feeling of a steering.

Instead of the shown one wheel, also a pair of wheels or all wheels of a steered vehicle can be steered in the manner shown.

The steering drive 4 has a motor 6, whose output shaft 7 is connected with a gear 8, which gears the speed of the motor 6. Accordingly, an output shaft 9 of the gear 8 has a substantially lower speed than the output shaft 7 of the motor 6. The output shaft 9 of the gear 8 is connected with a gear wheel 10, which is in active connection with a gear wheel 12 via a chain 11, the gear wheel 12 again operating the wheel 5. Instead of a chain, a toothed rim or another transmission link can be used, as long as it is ensured that there is a unique correlation between the angle position of the wheel 5 and the speed of the shaft 7. This correlation is a gear ratio between the speed of the shaft 7 and the turning of the wheel 5. This gear ratio includes not only the gear ratio of the gear 8, but also any available gear ratios between the gear wheels 10, 12. If additional transmission links are available, these must also be considered in connection with the calculation of the gear ratio.

The motor 6 is controlled by a control device 14, which supplies the motor 6 with electrical energy via a schematically shown cable 13. Accordingly, the motor 6 is an electrical motor. It could, for example, be an alternating current or a three-phase motor. Accordingly, if required, the control device 14 has a frequency converter, which converts direct current from a vehicle battery into a one or multi-phase alternating current or converts the frequency of a one- or multi-phase alternating current into another one.

Figure 4:
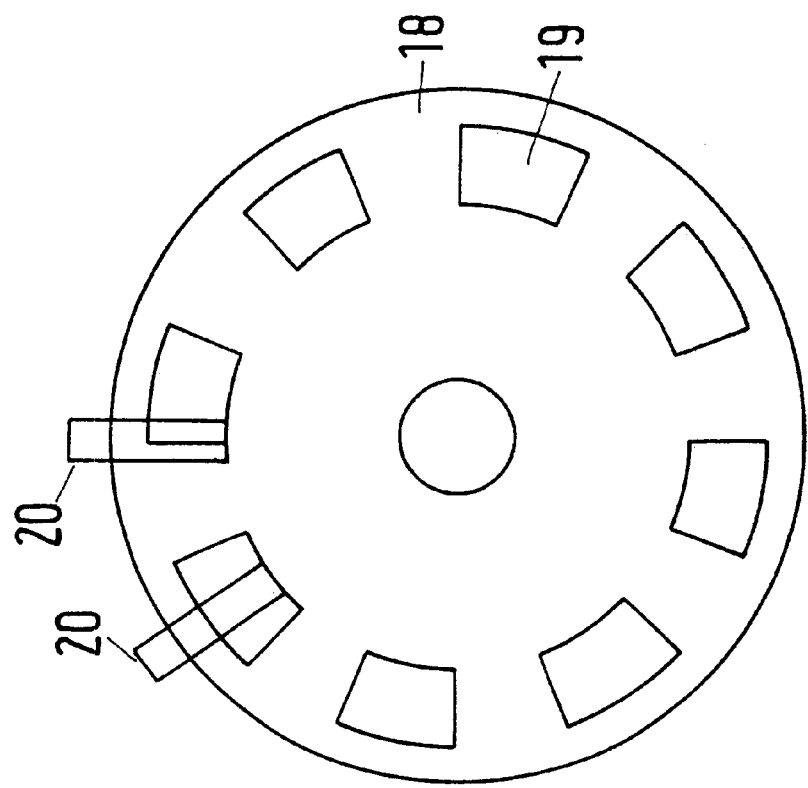
FIG. 4 a schematic view of the sensor

At the same time, the control device 14 ensures that the steering angle of the wheel 5, that is, the actual value of a steering angle predetermined by the steering angle transducer 2, corresponds to the desired value. In this connection, it is necessary that the control device 14 be informed of the actual position of the wheel 5. For this purpose, the control device 14 is connected with a sensor arrangement 16 shown in detail in FIG. 2. This sensor arrangement 16 is arranged in a housing 15, which surrounds the shaft 7. The sensor arrangement 16 has a sensor 17, which detects a relative movement or rotation of the shaft 7. In many cases, it is sufficient for the sensor to produce a pulse per rotation of the shaft 7. To improve the accuracy, however, it will be expedient to produce more than one pulse per rotation. For this purpose, the sensor 17 has a disk 18 (see also FIG. 4). This disk 18 has a large number of optically effective surfaces 19, in the present case eight. These surfaces 19 can, for example, have a reflection behaviour, which is different from the remaining areas of the disk 18. Opposite to these surfaces there are two optical sensors 20, which, for example, direct a light beam onto the disk, thus being able to determine by means of the reflection behaviour, if a surface 19 is directly below the optical sensor 20 or not. The optical sensors 20 have a distance, which amounts to $\frac{7}{8}$ of a division between the optical surfaces 19. Accordingly, a cooperation of the output signals of both optical sensors can cause the production of a total of 32 pulses per rotation of the shaft 7. Via a cable 21, these pulses are passed on to the control device 14. The control device 14 then "knows" how far from a start position the shaft 7 has turned on. The control device 14 counts each pulse on rotation in one direction, for example, clockwise positively, and in the other direction, that is, anti-clockwise negatively. Thus, the resulting number of pulses should have a direct correlation with the angle position of the steered wheel 5. Instead of the described optical sensors, also other sensors can be used, for example, magnetic, mechanical, electrical or Hall sensors. Also the number of 32 pulses is an example. Another example works with 128 pulses per rotation. Preferably, the number of pulses is $2^n$, as such numbers are easily worked in a digital calculator. In principle, however, also other numbers are possible.

To define a start point, from which the control device 14 can detect the pulses of the optical sensor 20, the sensor arrangement 16 additionally has a detection device 25, which produces a reference signal for at least one reference position of the shaft 7 or the steered wheel. At this reference position, the counter in the control device 14 should have the value zero. If this is not the case, the deviation between the value zero and the contents of the counter, however, does not exceed a predetermined value; the counter is reset to the value zero. If this error limit is exceeded, an error signal is produced.

Figure 3:
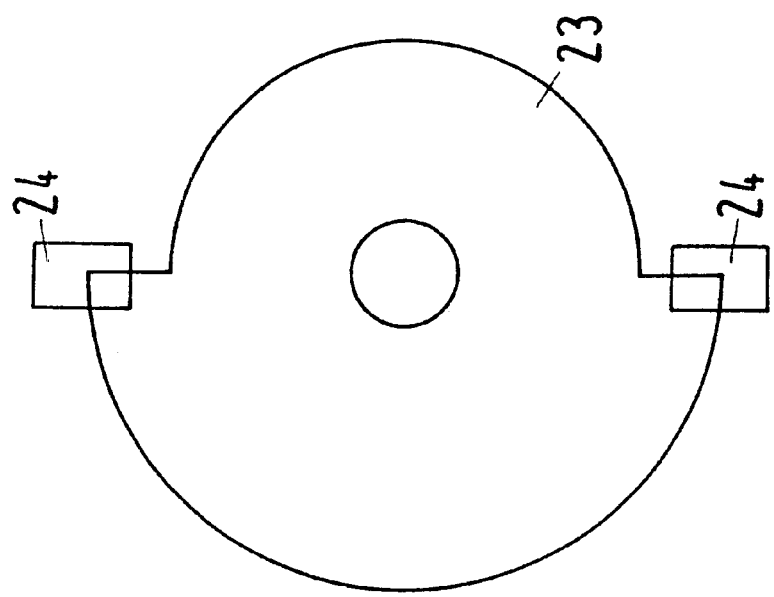
FIG. 3 a schematic view of a detection device

The detection device 25 has a gear 22, whose inlet is connected with the shaft 7. The outlet of the gear 22 is made as an annular disk 23, as shown in FIG. 3. Also the annular disk 23 cooperates with an optical sensor 24. As appears from FIG. 3, one half of the annular disk 23 has a larger radius than the other. This radius increase is chosen so that an optical sensor 24 is covered, when the larger radius of the annular disk 23 passes the sensor 24, or is released, when the smaller radius of the annular disk 23 passes the sensor 24. Thus, it can be established with a relatively high accuracy, when the annular disk 23 is in the rotation angle position shown in FIG. 3. This rotation angle position is the reference position of the shaft 7, from which position the counter in the control device 14 counts.

Particular in this is that the gear 22 has a gear ratio, which is exactly as large as the gear ratio between the motor 6 and the wheel 5. Thus, each position of the annular disk 23 corresponds exactly to an angle position of the wheel 5. This also applies when the wheel 5 is able to turn over more than 360°.

As both the sensor 17 and the detection device 25 are working touch-free and without retroactive forces, the gear 22 can have a relatively weak construction. It can, for example, be a plastic gear, which cannot perform any load function, but merely displace the annular disk 23. It can therefore be made so small that it can be arranged in the housing 15 together with the sensor 17. Accordingly, the motor 6 with the sensor arrangement 16 can, in a manner of speaking, be premanufactured and built into the vehicle as a complete unit. Thus, the sensor arrangement is also relatively well protected against pollution and damage.

The fact that both the sensor 17 and the detection device 25 detect the angle position of the shaft 7 in practically the same axial position causes that errors, which occur through different gear ratios, are not to be expected.

What is claimed is:

1. Steering device with a steering angle transducer, a steering drive having a motor having an output shaft and a first gear, at least one wheel driven by the steering drive and a sensor arrangement having detection device for detecting an angle position of the wheel, the detection device producing a reference signal for at least one reference position of the steering device, the detection device being connected to the motor via a second gear, the second gear having a gear ratio equal to a product of all gear ratios between the output shaft of the motor and the driven wheel.

2. Steering device according to claim 1, in which the second gear and the detection device are integrated in the steering drive.

3. Steering device according to claim 1, in which the detection device is a touch-free detection device.

4. Steering device according to claim 1, in which the detection device performs no reaction forces on the second gear.

5. Steering device according to claim 4, in which the detection device includes an optical sensor.

6. Steering device according to claim 1, in which the sensor arrangement includes a sensor which detects a relative movement of the motor shaft, the sensor producing more than one pulse per rotation.

7. Steering device according to claim 6, in which the number of pulses per rotation is an exponent of the number 2.

8. Steering device according to claim 6, in which the detection device and the sensor are connected to a control device having a counter, the counter having means to count pulses of rotations in one direction positively and pulses of rotations in the other direction negatively.

9. Steering device according to claim 8, including a control device which produces an error signal if the counter exceeds zero by a predetermined amount, when the detection device passes a reference position.

10. Steering device with a steering angle transducer, a steering drive having a motor having an output shaft and a first gear, at least one wheel driven by the steering drive and a sensor arrangement having a detection device for detecting an angle position of the wheel, the detection device producing a reference signal for at least one reference position of the steering device, the detection being connected to the motor via a second gear, the second gear having an output shaft associated with the detection device, and the second gear having a gear ratio such that the output shaft of the second gear rotates not more than one complete rotation when the driven wheel moves from one extreme position to another.

11. Steering device according to claim 10, in which the second gear and the detection device are integrated in the steering drive.

12. Steering device according to claim 10, in which the detection device is a touch-free detection device.

13. Steering device according to claim 10, in which the detection device performs no reaction forces on the second gear.

14. Steering device according to claim 13, in which the detection device includes an optical sensor.

15. Steering device according to claim 10, in which the sensor arrangement includes a sensor which detects a relative movement of the motor shaft, the sensor producing more than one pulse per rotation.

16. Steering device according to claim 15, in which the number of pulses per rotation is an exponent of the number 2.

17. Steering device according to claim 15, in which the detection device and the sensor are connected to a control device having a counter, the counter having means to count pulses of rotations in one direction positively and pulses of rotations in the other direction negatively.

18. Steering device according to claim 17, including a control device which produces an error signal if the counter exceeds zero by a predetermined amount, when the detection device passes a reference position.

19. Steering device according to claim 10, in which a section of the output shaft of the motor, on which a sensor of the sensor arrangement is located, traverses the second gear.

20. Steering device according to claim 19, in which the sensor is an optical sensor.

* * * * *